US 6,550,984 B2

(12) United States Patent
Andersen et al.

(10) Patent No.: US 6,550,984 B2
(45) Date of Patent: Apr. 22, 2003

(54) INTEGRATED OPTICAL COMPONENT WITH PHOTODETECTOR FOR AUTOMATED MANUFACTURING PLATFORM

(75) Inventors: Bo A. Andersen, Bridgewater, NJ (US); Kirk J. Witherow, Perkasie, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 45 days.

(21) Appl. No.: 09/727,772

(22) Filed: Dec. 1, 2000

(65) Prior Publication Data

US 2002/0067899 A1 Jun. 6, 2002

(51) Int. Cl.$^7$ ................................................. G02B 6/36
(52) U.S. Cl. ........................................ 385/93; 385/33
(58) Field of Search ............................ 385/31, 33–35, 385/88–94, 73–74, 25, 16–23, 140

(56) References Cited

U.S. PATENT DOCUMENTS 5,732,175 A    3/1998   Fan 6,061,493 A    5/2000   Gilliland et al.
6,253,010 B1 *  6/2001   Belser et al. ................ 385/52

FOREIGN PATENT DOCUMENTS

WO    WO-95/00865   *  1/1995   ............ G02B/3/06

OTHER PUBLICATIONS

"Bellcore Testing," www.elliottlabs.com, ® 2000 Elliott Laboratories (2 pp).

* cited by examiner

Primary Examiner—Akm E. Ullah
Assistant Examiner—Jerry T Rahll

(57) ABSTRACT

An apparatus for retaining optical components in a planar configuration has a lens and an electro-optic component. The lens is optically coupled to the optical components. The electro-optic component is coupled to a support member. Alignment of the lens with the electro-optic component is performed by directly positioning the lens to maximize the transfer of optical energy from the lens to the electro-optic component. No optical fibers need be directly manipulated to perform the alignment, thus allowing for alignment of optical components with electro-optical components using the same procedures and equipment as used for aligning optical components with optical components.

13 Claims, 4 Drawing Sheets

US 6,550,984 B2

INTEGRATED OPTICAL COMPONENT WITH PHOTODETECTOR FOR AUTOMATED MANUFACTURING PLATFORM

FIELD OF THE INVENTION

The present invention relates to the field of fiber optics and specifically to a planar housing for optical components having an electro-optic component.

BACKGROUND

In fiber optic transmission systems, it is desirable to couple as much of the transmitted light from a fiber optic cable to a receiving device as possible. One factor determining the amount of light that can be transmitted is the alignment of the optical fiber cable with the receiving device. Alignment of an optical fiber with a receiving device is a critical step in an automated manufacturing process. Of particular interest is the alignment of optical fibers with electro-optic devices in an automated manufacturing process designed for handling optical fiber terminations.

One technique used to align optical fibers with electro-optic devices is to fasten the optical fibers inside of the electro-optic device package. Some prior art methods of fastening an optical fiber inside of an electro-optic package utilize an epoxy to attach the optical fiber to a substrate. Other methods use high melting point bonding materials, such as silicone. Typically, in the latter case, thermal sensors are required to monitor temperature to avoid damage to components. These techniques require extensive direct manipulation of the optical fibers and do not always result in optimal alignment.

Other techniques involve connecting an optical fiber, or group of fibers, to a ferrule prior to alignment with an electro-optic device. The fiber is inserted so as to extend beyond a front surface of the ferrule. The exposed fiber material is then cleaved and polished. Typically, individual fibers must be inserted into respective individual holes or passages in a prefabricated ferrule. The passages align the fibers at a predetermined spacing for coupling to the ends of the fibers in a complementary connector ferrule or other component.

This process too, requires extensive direct manipulation of the optical fibers and is not well suited to an automated manufacturing process. Because of the very thin size and extremely fragile nature of the fibers, it can be difficult to insert a fiber into a single aligning hole or passage, and even more difficult trying to insert several fibers from a group of fibers into several passages. If a single fiber is broken, the fiber must be discarded and/or reworked.

Because electro-optic devices, such as photo detectors, typically are manufactured as discrete components, coupling and aligning with optical fibers is tedious and difficult. Often, specialized equipment and procedures (beyond what is needed for optical components only) are needed to accommodate the electro-optic devices. Thus a need exists for an apparatus and method which can efficiently couple and align optical components with electro-optic components in an automated manufacturing process.

SUMMARY OF THE INVENTION

An optical component housing having a region for retaining at least one optical component includes at least one lens optically coupled to one of the optical components. At least one electro-optic component is attached to the apparatus. Each electro-optic component is optically coupled to a corresponding lens. Each electro-optic component is aligned with a corresponding lens by positioning the corresponding lens.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. The various features of the drawings are not to scale. On the contrary, the dimensions of the various features may arbitrarily be expanded or reduced for clarity. Included in the drawing are the following figures.

DETAILED DESCRIPTION

Figure 1:
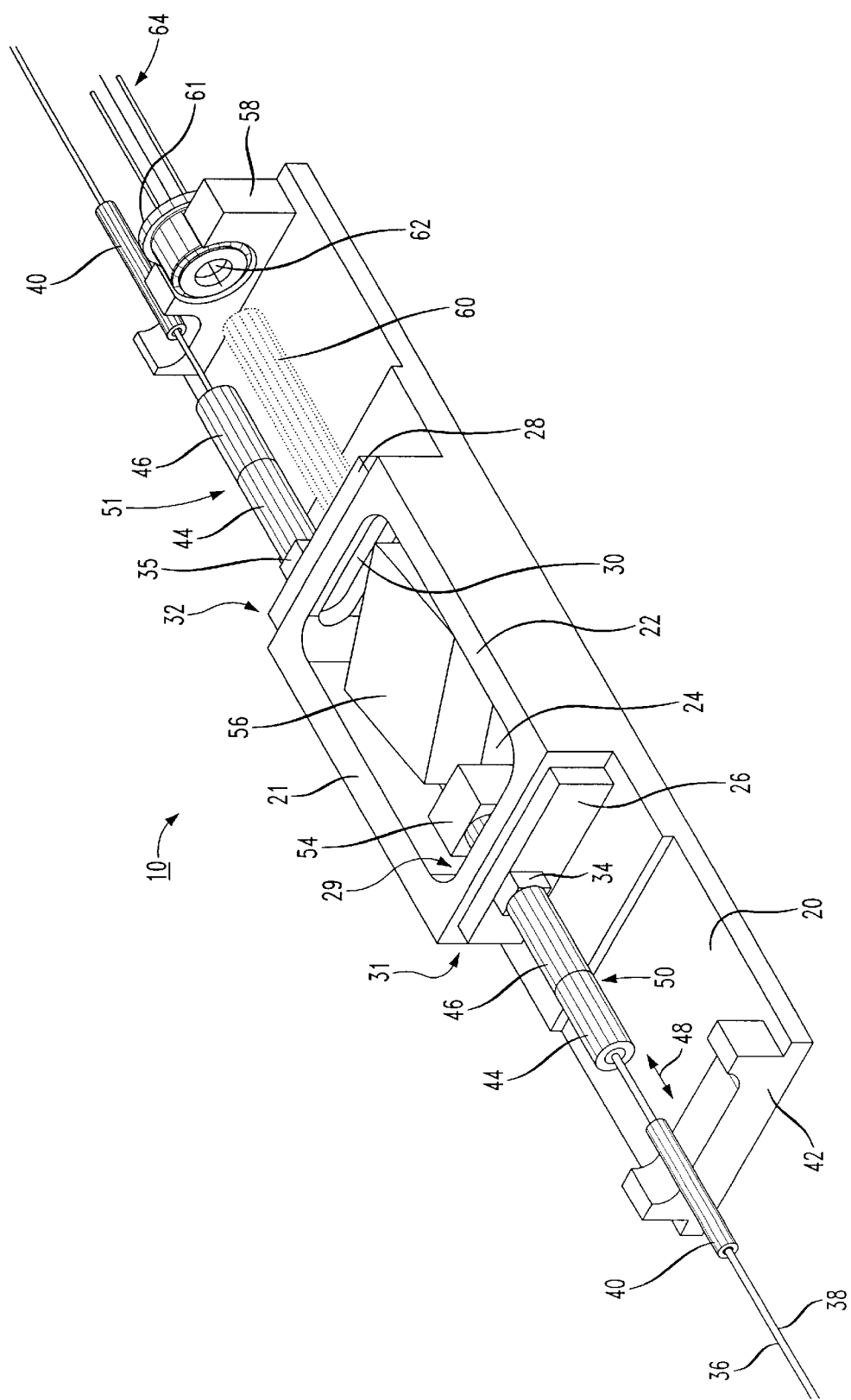
FIG. 1 is an isometric view of a structure for retaining optical components having an electro-optic component, in accordance with an exemplary embodiment of the present invention.

Referring now to the drawings, wherein like reference numbers refer to like elements throughout, FIG. 1 is an isometric view of a structure for retaining optical components having an electro-optic component, in accordance with an exemplary embodiment of the present invention, generally designated as 10. In FIG. 1, the exemplary electro-optic component 62 is a photodetector. A photodetector is an electro-optic device for receiving optical energy and providing a corresponding electrical signal. The voltage or current of the electrical signal is proportionate to the intensity of the received optical energy. Photodetector 62 is housed in a TO type package 61. TO type packages are well known in the art. Optical energy is provided to electro-optic component 62 by lens 60. Electrical signals corresponding to this optical energy are provided by electro-optic component 62, on electrical conductors 64.

A description of the structure shown in FIG. 1 follows. Base structure 20 forms the bottom of region 24. Region 24 may retain optical components such as wavelength division multiplexers (WDMs), lenses, prisms, taps, reflectors, and isolators. Optical components 54 and 56 represent exemplary optical components which may be retained in region 24. In the exemplary embodiment of the invention shown in FIG. 1, optical component 54 is an isolator and optical component 56 is a prism. In this embodiment, isolator 54 ensures that optical energy is directed toward prism 56 with minimal reflection of optical energy back toward collimated lens assembly 50. Optical energy which has interacted with isolator 54 is directed toward prism 56. Prism 56, apportions and routes the optical energy received from isolator 54 to collimated lens assembly 51 and lens 60.

Isolator 54 and prism 56 form a free air space optical network. Optical energy is coupled between window 26 and isolator 54, between isolator 54 and prism 56, and between prism 56 and window 28, through air. A free air space optical network may not be appropriate in an environment with high ambient optical energy. In high ambient optical energy environments, it is advantageous to provide a cover over region 24 (cover not shown in FIG. 1).

As depicted in FIG. 1, members 21 and 22 are integral with base structure 20, and form opposing sides of region 24. It is envisioned, however, that members 21 and 22 may be separate from base structure 20, and attached thereto by any appropriate means such as, snap fit, press fit, bolts, machine screws, or adhesive. Base structure 20 and/or members 21 and 22 may comprise any appropriate material, such as stainless steel.

Opposing sides 31 and 32 include openings 29 (not shown in FIG. 1) and 30, respectively. Openings 29 and 30 each allow optical energy to enter and exit region 24. Windows 26 and 28 are attached to sides 31 and 32. Windows 26 and 28 comprise an optical transmissive material, such as glass or anti-reflective glass. Attachment of windows 26 and 28 to sides 31 and 32 may be by any means, such as press fit coupling, snap fitting, welding, soldering, and/or adhesively attaching.

Optical fibers 36 and 38 are axially positioned within bend limiter tubing 40. Bend limiter tubing 40 is a hollow, generally cylindrical sleeve through which optical fibers 36 and 38 are positioned to limit the bending of the optical fibers. Optical fibers 36 and 38 are attached to the inner surface of bend limiter tubing 40 with a filler material. The filler material may comprise, for example, a commercially available pliable adhesive (e.g., silicone). Attaching optical fibers 36 and 38 to the inner surface of bend limiter tubing 40 facilitates the automated assembly process by reducing the motion of optical fibers 36 and 38. The filler material reduces axial motion of optical fibers 36 and 38 in the directions indicated by arrow 48. Axial motion may be caused by mechanical strain applied to optical fibers 36 and 38 during the assembly process. Axial motion may also be caused by expansion and contraction of optical fibers 36 and 38, and/or other components, due to thermal variation. Excessive axial motion may cause optical fibers 36 and 38 to bend and ultimately sustain damage. In an exemplary embodiment of the invention, optical fibers 36 and 38 are rigidly attached to collimated lens assembly 50. This rigid attachment also contributes to the bending of optical fibers 36 and 38 when subjected to axial motion. The filler material also reduces radial motion of optical fibers 36 and 38, thus reducing the possibility of any damage due to radial motion.

Support members 42 and 58 provide support for bend limiter tubing 40, optical fibers 36 and 38, and electro-optic component 62, which is housed in TO type package 61. The support provided by support member 42 reduces bending of optical fibers 36 and 38, and reduces the possibility of optical fibers 36 and 38 becoming detached from collimated lens assembly 50. In an exemplary embodiment of the invention, bend limiter tubing 40 is attached to support member 42. Attachment of bend limiter tubing 40 to support member 42 may be achieved through the use of, for example, an adhesive such as epoxy. Attachment of bend limiter tubing 40 to support member 42 facilitates the automated assembly process by reducing movement of bend limiter tubing 40, which in turn reduces movement of optical fibers 36 and 38.

Optical fibers 36 and 38 are attached to the collimated lens assembly 50. Collimated lens assemblies may comprise combinations of several components, such as lenses, filters, ferrules, and wavelength division multiplexers (WDMs). Such components are also retained in region 24. Exemplary collimated lens assembly 50 comprises a ferrule 44, a lens 46, and an optical filter 34. Ferrule 44 is a cylindrical device having apertures sized to fit optical fibers 36 and 38. Optical fibers 36 and 38 are mounted in ferrule 44. Ferrule 44 centers and aligns optical fibers 36 and 38. Optical fibers 36 and 38 are terminated within ferrule 44. Typically, cylindrical ferrules are limited to housing no more than two optical fibers because of the strict tolerances associated with transferring optical energy between a pair of optical fibers.

Lens 46 focuses optical energy from optical fibers 36 and 38. Lens 46 may comprise any suitable lens, such as a gradient radial index (hereinafter GRIN) lens, a molded aspheric lens, or a ground spherical lens. In the exemplary embodiment shown in FIG. 1, lens 46 is a GRIN lens. Note that collimated lens assemblies 50 and 51 comprise optical filters 34 and 35, respectively, attached to the each lens of the collimated lens assemblies. Filters 34 and 35 are optional. Depending upon system requirements, other optical components (e.g., WDMs) may be positioned between the lens of the collimated lens assembly and the window.

Collimated lens assembly 50 is attached to window 26 and collimated lens assembly 51 is attached to window 28. The attachment of collimated lens assembly 50 to window 26 and collimated lens assembly 51 to window 28, may be by any appropriate means, such as through the use of an adhesive (e.g., optical quality heat cured epoxy MH77A). Adhesively attaching the collimated lens assemblies to the windows does not require sustained localized heating, in contrast to soldering and laser welding. Therefore components are not as susceptible to heat damage. Also, because adhesively attaching the collimated lens assemblies to the window does not require access by a laser welder, more collimated lens assemblies can be adhered to the window. Furthermore, window 26 and 28 may be adjusted in size to accommodate any number of lens assemblies and therefore, more optical fibers and/or electro-optic components. Additionally, the curing process associated with adhesively attaching the collimated lens assemblies to the windows does not misalign the components to the same degree as does post weld shift. Thus the alignment procedure associated with adhesively attaching collimated lens assemblies to the windows is less time consuming and more easily accomplished than the alignment process associated with laser welding.

It is emphasized that the embodiment of the invention shown in FIG. 1 is exemplary. For example, FIG. 1 shows support members 42 and 58 as integral parts of base structure 20. It is envisioned that base structure 20 and support members 42 and 58 may be separate, and attached thereto by any appropriate means such as snap fit, press fit, bolt, or adhesive.

Figure 2:
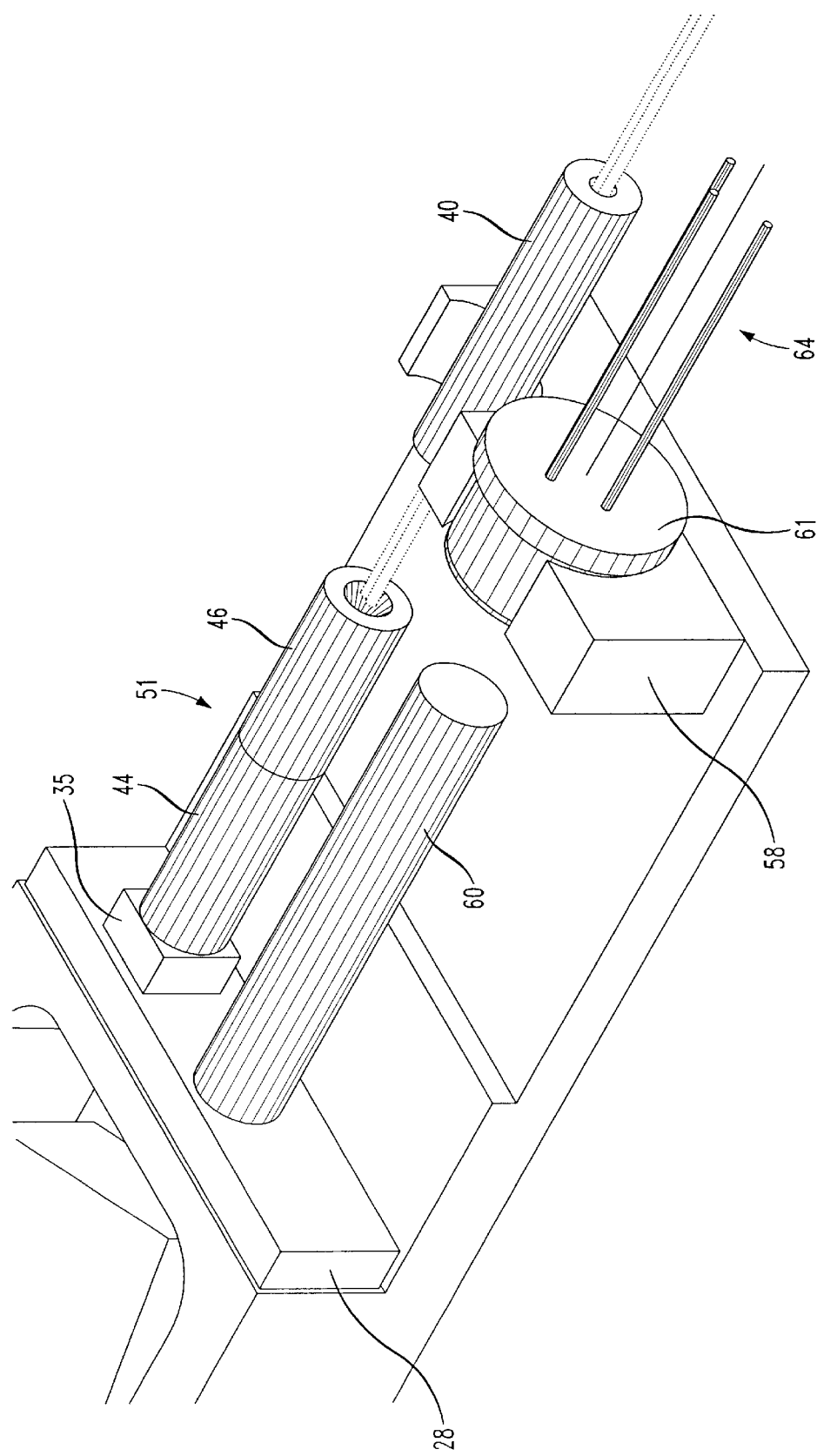
FIG. 2 is an alternate aspect isometric view of the structure shown in FIG. 1, emphasizing an electro-optic component.

FIG. 2 is an alternate aspect isometric view of the structure shown in FIG. 1, emphasizing an electro-optic component. Electro-optic component 62 is housed in a standard TO type package 61. TO type packages are well known in the art. TO type package 61 is attached to support member 58. Support member 58 differs in shape than support member 42 to accommodate TO type package 61. Support member 58 comprises a recess for retaining the TO type package 61.

Figure 3:
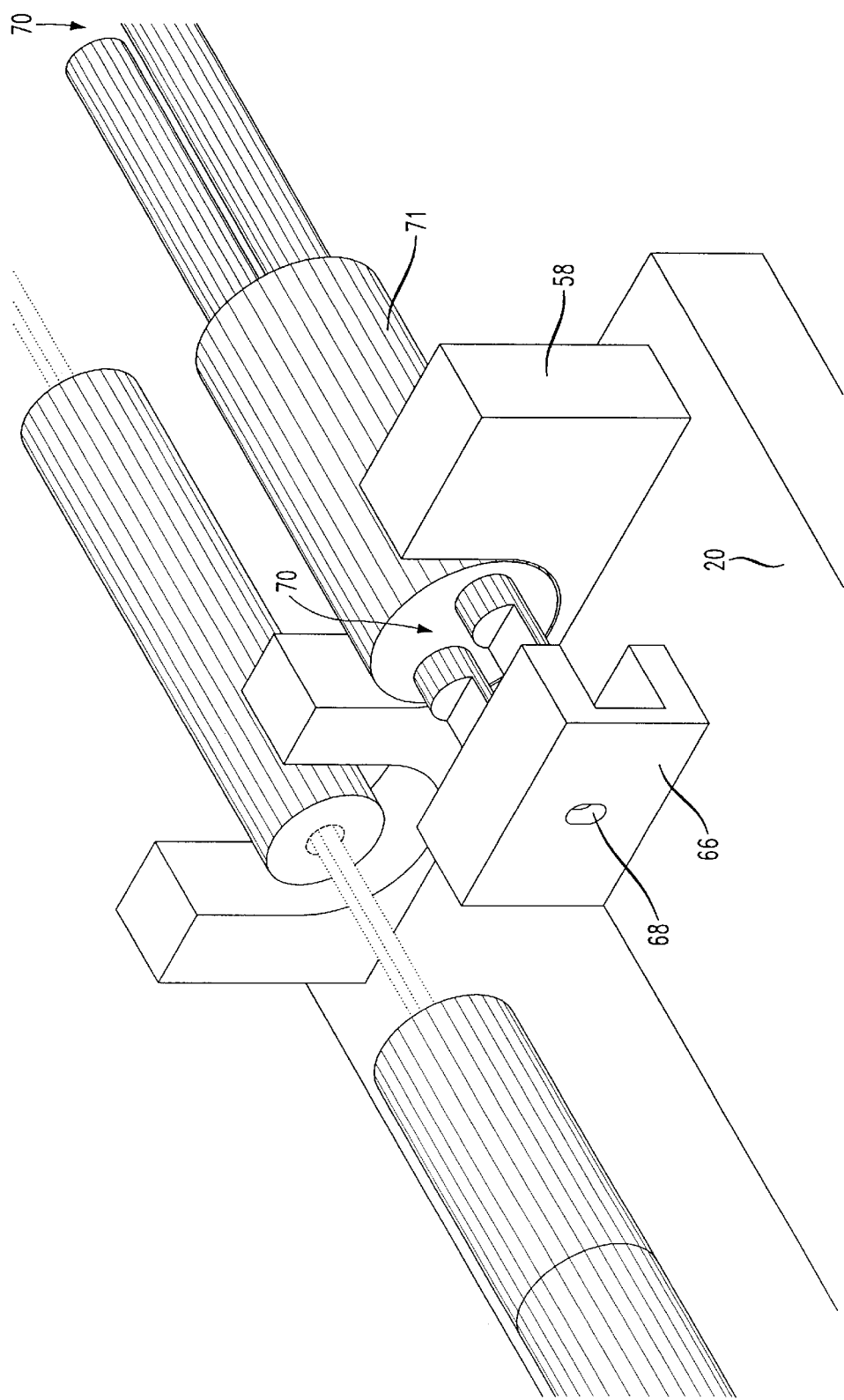
FIG. 3 is an isometric view of another exemplary embodiment of the invention, having the electro-optic component housed in a support structure.

FIG. 3 shows another embodiment of the invention, wherein the electro-optic component is housed in a support structure 66. The actual electro-optic component is not visible in FIG. 3. Electrical conductors 70 are electrically coupled to the electro-optic component housed in support structure 66. Support member 58, in FIG. 3, is shaped to conform to electrical conductor housing 71. Electrical conductor housing 71 is attached to support member 58 by any appropriate means, such as adhesively, press fit, or snap fit.

Alignment of lens 60 (lens not shown in FIG. 3) with the electro-optic component housed in support structure 66 is accomplished by positioning lens 60 to maximize the optical energy transferred through opening 68 to the electro-optic component. In an exemplary embodiment of the invention, this alignment is accomplished by sliding support structure 66 into the proper position. During the sliding process, the bottom of support structure 66 remains in contact with the upper surface of base structure 20. This limits the range of motion used to align support structure 66 to one plane (i.e., coplanar with the plane of the upper surface of base structure 20), thus eliminating the need to move the support structure 66 up or down to accomplish the alignment.

Figure 4:
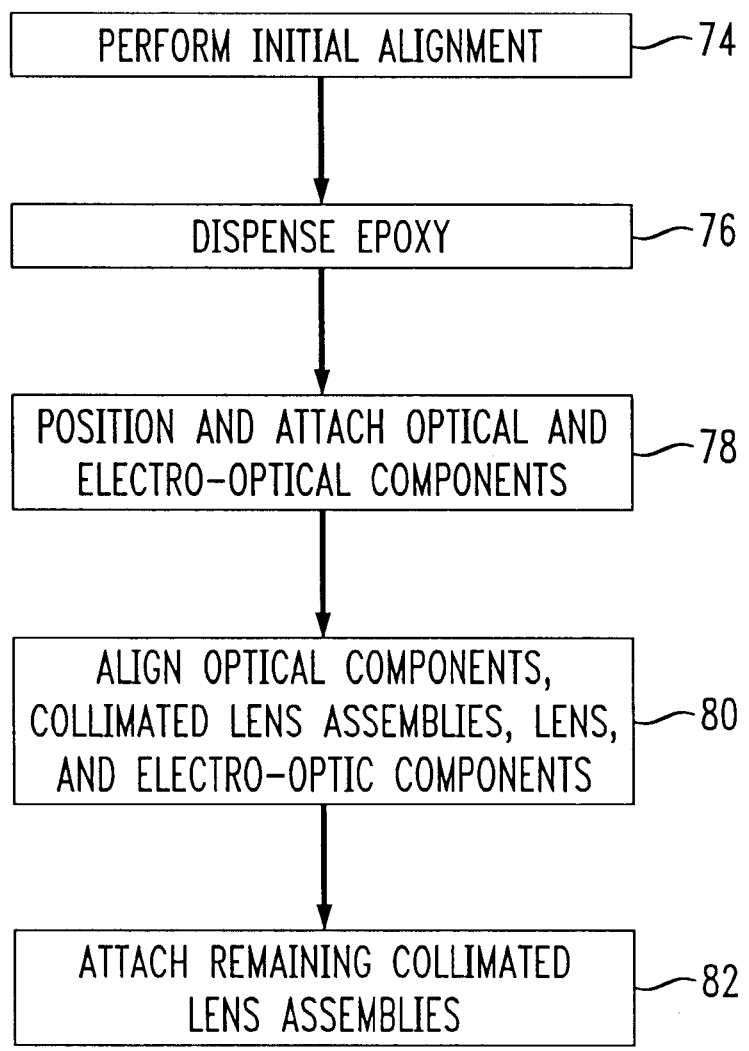
FIG. 4 is a flow diagram of an exemplary process for aligning optical components in accordance with the present invention.

FIG. 4 is a flow diagram of an exemplary process for aligning optical components in accordance with the present invention. The description of the process depicted in FIG. 4 refers to elements in FIG. 1.

Initially, in step 74, alignment of collimated lens assemblies 50 and 51, and lens 60 with optical components 54 and 56 is performed to determine nominal placement coordinates to be used in the automated assembly process. Base structure 20, support structures 42 and 58, and windows 26 and 28 are provided preassembled (hereinafter "the housing assembly"). The nominal placement coordinates determine the location of optical components 54 and 56, collimated lens assemblies 50 and 51, and lens 60 on the housing assembly. Initial alignment is performed by positioning collimated lens assembly 50, on window 26. Optical components 54 and 56 are positioned in their approximate locations within the housing assembly. Alignment electro-optic devices, such as photodetectors (photodetectors not shown in FIG. 1) are positioned proximate window 28 at the approximate expected locations of collimated lens assemblies 51 and lens 60. Alignment electro-optic devices are placed proximate to window 28 temporarily to perform initial alignment, and are removed prior to assembly. Optical energy is provided through collimated lens assembly 50, through optical components 54 and 56, to the photodetectors. An optical energy source comprises collimated lens assembly 50 and an energy source. Any appropriate energy source may be used, such as a light emitting diode or a laser. The positions of optical components 54 and 56, collimated lens assembly 50, and the photodetectors are adjusted until the voltage or current of the electrical signals provided by the photodetectors is maximized; thus indicating proper initial optical alignment. Nominal placement coordinates are determined from these positions, and are programmed into an automated assembly placement mechanism.

Once the initial alignment is complete and nominal placement coordinates have been established, the automated assembly process begins. First, the housing assembly is placed on a conveyor belt. In step 76, the housing assembly is then moved to an epoxy station where a pattern of epoxy is deposited in region 24 of the housing assembly. The pattern of epoxy corresponds to the placement coordinates and shapes of optical components 54 and 56.

In step 78, optical components 54 and 56 are positioned and attached to the housing assembly in accordance with the placement coordinates. Attached components 54 and 56 act as a baseline for optically aligning the remaining components. The housing assembly is clamped by a clamping mechanism having a heater. The heater starts the curing process as the optical components are placed within the housing assembly and adhesively attached to the housing assembly by the pattern of epoxy. Optical components 54 and 56 are placed in the housing assembly by an automated placement mechanism, which places the optical components in the proper position and at their respective nominal placement locations, within a small tolerance. Also in step 78, electro-optic component 62 is attached to support member 58. As shown in FIG. 1, the exemplary TO type package 61 is attached to support member 58. This attachment may be by any appropriate means, such as adhesively, snap fit, or press fit. As previously explained, TO type package 61 is exemplary. Thus, accomplishing step 78 with the embodiment of the invention shown in FIG. 3, incorporates attaching electrical conductor housing 71 to support member 58 using any appropriate means, such as adhesively, snap fit, or press fit. At this point in the alignment process, components 54, 56, and electro-optic component 62 are fixed in their respective positions. Thus, the remainder of the alignment process comprises optically aligning collimated lens assembly 50 with electro-optic component 62 through components 54, 56, and lens 60, as described in step 80.

In step 80, collimated lens assembly 50 is aligned with collimated lens assembly 51 through components 54 and 56. Also, collimated lens assembly 50 is aligned with electro-optic component 62 through components 54, 56, and lens 60. Collimated lens assemblies, optical fibers, and bend limiters are provided preassembled. Each optical fiber is provided with a connector at the end opposite the collimated assembly. This connector allows for providing, receiving, and measuring optical signals. Alignment in step 80 is performed to compensate for the tolerances associated with the placement of optical components 54 and 56. Collimated lens assemblies 50 and 51, and lens 60 are positioned in accordance with the nominal placement coordinates. Optical energy is provided via the connector on the fibers attached to collimated lens assembly 50. Optical energy received via the connectors on the fibers attached to collimated lens assembly 51 and electrical energy on electrical conductors 64 is monitored while collimated lens assemblies 50 and 51, and lens 60 are positioned to ensure maximum throughput of optical energy. Optical fibers do not have to be positioned directly. In step 82, collimated lens assemblies 50 and 51, and lens 60 are adhesively attached to the housing assembly in accordance with the most recent alignment positions.

Many of the automated assembly steps herein described are performed concurrently. Thus, the process depicted in FIG. 4 facilitates an automated assembly process by allowing separate and concurrent (1) assembly of the housing assembly, (2) assembly of collimated lens assemblies and optical fibers, and (3) alignment, positioning, and attachment of optical components, collimated lens assemblies, lens, and electro-optic components.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An optical component assembly comprising:
   a region for retaining at least one optical component therein;
   first and second optically transmissive opposing sides of said region;
   at least one lens optically coupled to a corresponding one of said at least one optical component, wherein said at least one lens is attached to said first opposing side; and at least one electro-optic component attached to said optical component assembly, wherein:
said at least one lens is positioned between a respective electro-optic component and said first opposing side; and the electro-optic component is attached to the assembly in a manner such that light is coupled thereto by the lens and the lens is aligned therewith by movement of the lens, and
at least one of the at least one electro-optic component is a photodetector.

2. The optical component assembly in accordance with claim 1 wherein the at least one lens is selected from a group consisting of at least one of a gradient radial index lens, a molded aspheric lens, and a ground spherical lens.

3. The optical component assembly in accordance with claim 1 wherein said first and second opposing sides comprise an optically transmissive material selected from the group consisting of glass and anti-reflective glass.

4. The optical component assembly in accordance with claim 1 further comprising a support structure for supporting the at least one electro-optic component.

5. The optical component assembly in accordance with claim 1, wherein said assembly is configured to couple light through said second opposing side, said at least one optical component, said first opposing side, and said at least one lens to said respective electro-optic component, and the lens is aligned with said assembly by movement of the lens.

6. The optical component assembly in accordance with claim 1 further comprising a base forming a bottom side of said region, wherein said base comprises at least one support member for supporting at least one of an optical component and the at least one electro-optic component.

7. The optical component assembly in accordance with claim 6 wherein said base comprises stainless steel.

8. The optical component assembly in accordance with claim 6, wherein said support member has at least one recess for supporting said at least one electro-optic component.

9. A method for aligning components within an optical component assembly having at least one electro-optic component, at least one lens, and a region for retaining at least one optical component, said method comprising the steps of:

providing said assembly comprising said region, wherein opposing first and second sides of said region comprise an optically transmissive material;
positioning said at least one optical component within said region;
attaching said at least one optical component within said region;
attaching said at least one electro-optic component to said assembly;
positioning at least one optical energy source lens assembly proximate said first side of said region, wherein said at least one optical energy source lens assembly is optically coupled to said at least one optical component;
positioning said at least one lens proximate said second side of said region wherein said at least one lens is optically coupled to said at least one optical component and to said at least one electro-optic component;
attaching one of said at least one optical energy source lens assembly and said at least one lens to said assembly; and
aligning said at least one optical energy source lens assembly with said at least one electro-optic component through said at least one optical component and through said at least one lens by positioning the other one of said at least one optical energy source lens assembly and said at least one lens.

10. The method in accordance with claim 9, wherein said lens is selected from the group consisting of a gradient radial index lens, a molded aspheric lens, and a ground spherical lens.

11. The method in accordance with claim 9 wherein said optical energy source lens assembly comprises at least one optical fiber attached to a collimated lens assembly.

12. The method in accordance with claim 9 wherein said electro-optic component comprises a photodetector.

13. The method in accordance with claim 9, wherein said optically transmissive material comprises a material selected from the group consisting of glass and anti-reflective glass.

* * * * *